United States Patent [19]

Reddy

[11] 4,303,261
[45] Dec. 1, 1981

[54] PIPE SYSTEM INCLUDING READILY REMOVABLE PIPE LINK

[76] Inventor: Robert R. Reddy, 1195 Michillinda Ave., Pasadena, Calif. 91107

[21] Appl. No.: 111,642

[22] Filed: Jan. 14, 1980

[51] Int. Cl.³ .............................................. F16L 21/08
[52] U.S. Cl. ....................................... 285/31; 285/82; 285/90; 285/179
[58] Field of Search ........................ 285/19, 20, 31, 32, 285/358, 359, 394, 395, 82, 90, 179; 403/234, 237, 190, 191

[56] References Cited

U.S. PATENT DOCUMENTS

| | | | |
|---|---|---|---|
| 1,299,042 | 4/1919 | Schepmoes | 285/31 X |
| 1,308,853 | 7/1919 | McVoy | 285/32 |
| 1,580,941 | 4/1926 | Albinson | 285/31 |
| 1,596,863 | 8/1926 | Albinson | 285/32 |
| 3,527,245 | 9/1970 | LaMontagne | 285/31 X |

*Primary Examiner*—Dave W. Arola
*Attorney, Agent, or Firm*—Donald D. Mon

[57] ABSTRACT

A pipe system with a first and a second buttress, each buttress including a support tube having a central axis. The support tubes are axially aligned and spaced from one another. The buttress also includes a camming surface. A tubular first and second follower coaxially surround respective support tubes and are axially freely movable and rotatable thereon. The followers are proportioned and arranged to contact the camming surface so as to assume a respective first and second axial location as a function of a first and second rotational position. A pipe link comprises a rigid length of pipe having a length short enough to fit between the follower members when they are at their maximum spacing from one another, and long enough to be trapped by them when they are brought to their minimum spacing. The pipe link can thereby be inserted when the followers are turned so as to move apart from one another and can be trapped and held to form a fluid circuit when they are turned so as to approach one another.

26 Claims, 9 Drawing Figures

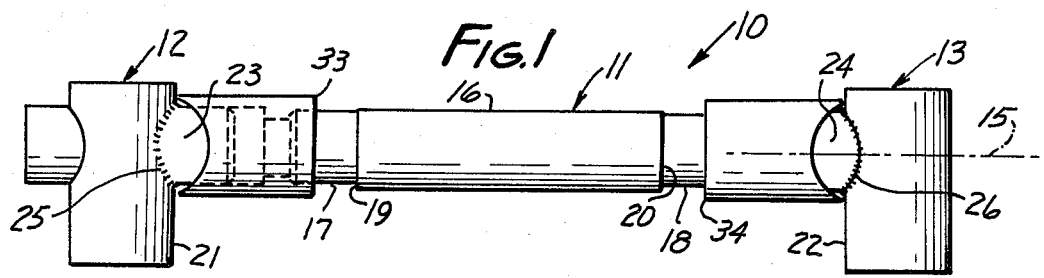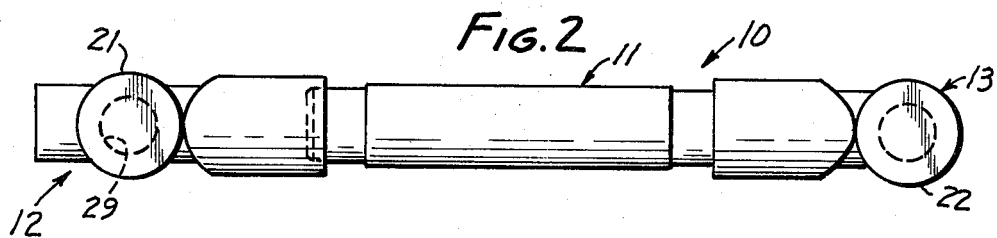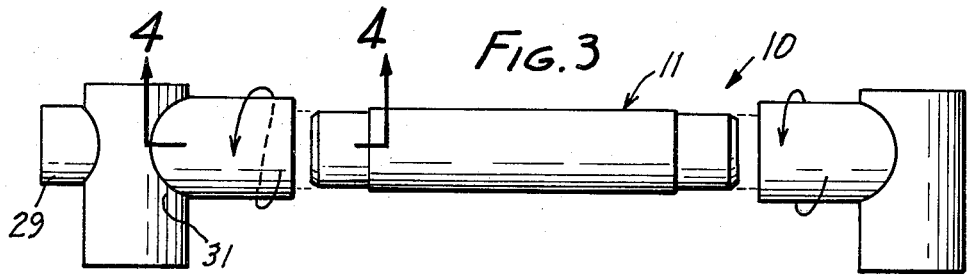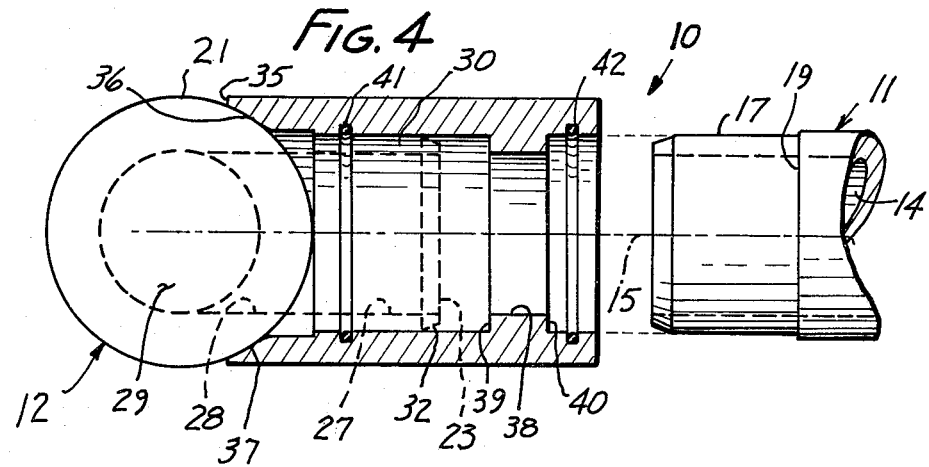

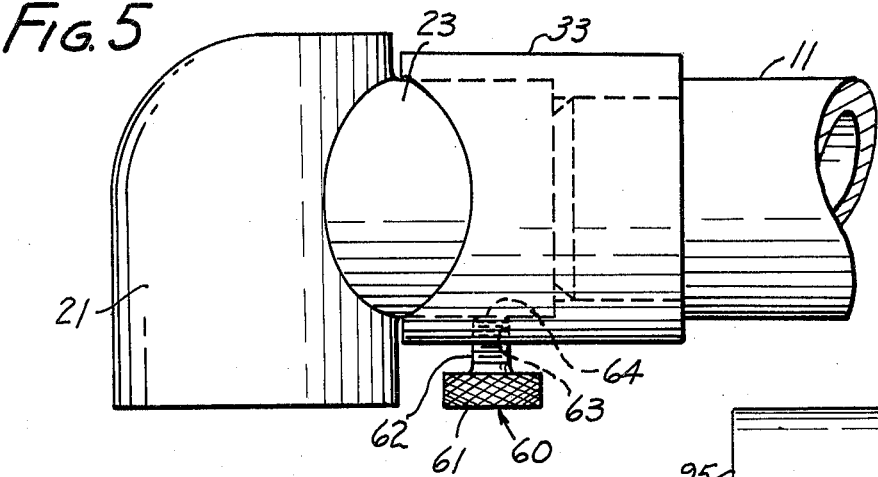
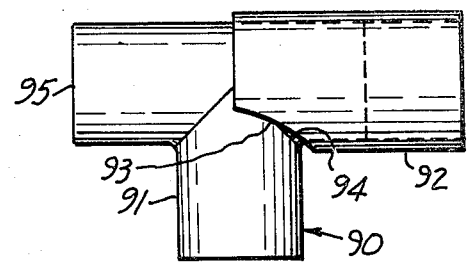
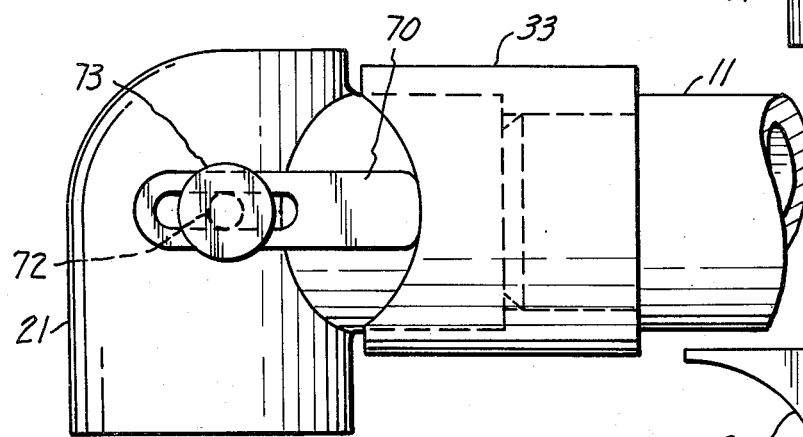
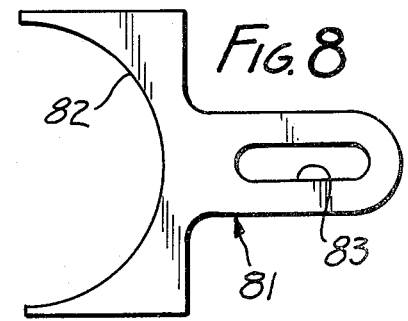
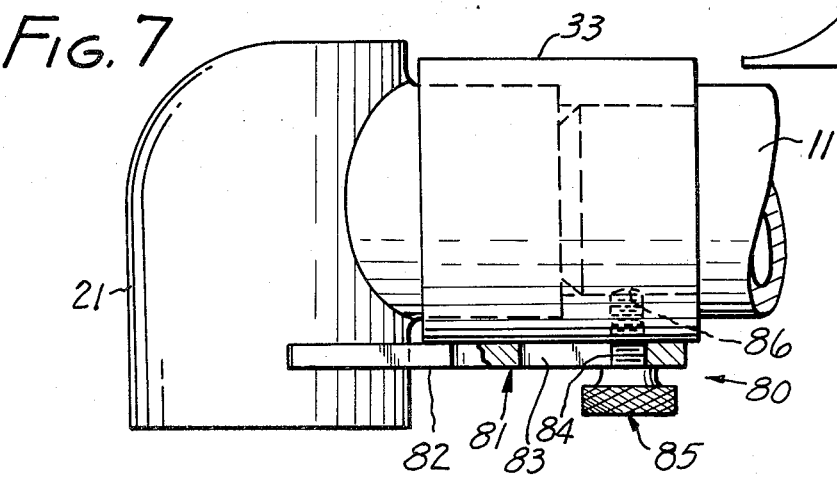

PIPE SYSTEM INCLUDING READILY REMOVABLE PIPE LINK

FIELD OF THE INVENTION

This invention relates to pipe systems, especially to drain systems with readily removable pipe links.

BACKGROUND OF THE INVENTION

In piping systems, especially in drain systems for cooker installations such as chicken friers, it is advantageous to be able quickly to remove and replace pipe links for clean-out purposes. The cleaning of traps and drains in grease systems, or other types of fluid systems, can thereby be facilitated.

BRIEF DESCRIPTION OF THE INVENTION

A pipe system according to this invention includes a first and a second buttress member, each said buttress member comprising a support tube which has a central axis. The support tubes are axially aligned and spaced from one another. Each buttress member also includes a camming surface. A first and a second tubular follower member coaxially surrounds said support tubes and is axially freely movable and rotatable thereon. The followers are so proportioned and arranged as to contact a respective camming surface, and when rotated are positioned axially in accordance with said contact between a first and a second axial position as a function of a respective first and second angular position. A pipe link comprises a rigid length of pipe having a length short enough to fit between the follower members when they are at their maximum spacing from one another, and long enough to be trapped by them when they are brought to their minimum spacing.

BRIEF DESCRIPTION OF THE DRAWINGS

The above and other features of this invention will be fully understood from the following detailed description and the accompanying drawings, in which:

FIG. 1 is a side elevation showing a pipe system according to the invention in installed conditions;

FIG. 2 is a top view of FIG. 1;

FIG. 3 is a view similar to FIG. 1 with a pipe link loosened and removed;

FIG. 4 is a cross-section taken at line 4—4 in FIG. 3.

FIGS. 5, 6 and 7 show locking means useful with the invention;

FIG. 8 shows a part of FIG. 7; and

FIG. 9 is a side elevation of a modification of the system of FIG. 1.

In FIG. 1 there is shown a pipe system 10 according to the presently preferred embodiment of the invention. It includes a pipe link 11, and a first and a second buttress member 12, 13, respectively. The pipe link is a rigid length of pipe having an internal passage 14 and a central axis 15. Its outer surface 16 is cylindrical, and it is provided with a pair of steps 17, 18 that form shoulders 19, 20.

Each buttress member 12, 13 includes a camming surface 21, 22 and a support tube 23, 24, respectively. The support tubes are welded to the camming surfaces by weldments 25, 26 as can best be seen in FIG. 4. The buttress members are internally ported. There is a fluid passage 27 in buttress member 12, for example, and porting 28 inside the cam member for connection to other fluid conduitry. If desired there can also be additional porting 29 for further connection, or another support tube if additional pipe links and buttress members are to be connected into the system.

Because buttress members 12 and 13 are identical, full details will be given only of buttress member 12, it being understood that they will be identical for buttress member 13 as well. As can best be seen in FIGS. 1 and 4, the support member includes an external cylindrical surface 30 which extends along axis 15. The support tubes are coaxial with and spaced from one another. An external cylindrical surface 31 on the buttress member extends peripendicularly to the axis 15, and preferably has a diameter somewhat larger than that of surface 30. The support tube has a tapered tip 32. Simply stated, surface 31 and support tube 23 are parts of perpendicularly intersecting cylinders or tubes.

Follower members 33, 34 are fitted to respective support tubes 23, 24. They are freely rotatable, and are axially slidable on the respective support tubes. At one end 35 they include a surface 36 which contacts portion 37 of camming surface 31. Viewed sidewardly as in FIG. 4, surface 36 is circularly arcuate, so that in a first position it makes a close long-line contact with surface 31 in a first angular and rotational position. Rotation of the follower will of course cause the surface 36 to move along surface 31 and shift the follower member axially, making a point or short line contact at a second angular and rotational position.

The follower member includes a central passage 38 which extends from end to end, and has a pair of shoulders 39, 40. O-rings 41, 42 are provided to make seals with the respective support tubes, and steps on the pipe links. The axial movement of the follower member is free except as limited by the shoulders on the pipe link and by the camming surface itself and also by abutment of the shoulders.

The operation of this device will be evident from the foregoing. The buttress members are attached to a structure such as the framework of a frier or other device of which this system forms part of its plumbing (not shown). To remove the pipe link, the followers are twisted from their setting shown in FIG. 1 to that which is shown in FIG. 3. This causes the follower members to move toward the cams and frees the pipe link from lateral restraint. The pipe link can then be removed. It can readily be cleaned out, and the system can be drained with easy access. To reinstall the pipe link, it is placed in the position shown in FIG. 3, and the follower members are rotated to the position shown in FIGS. 1 and 2 which causes them to move toward one another. The ends of the pipe are trapped and structurally held, with a fluid seal made by the O-ring seals. It will be understood that the dimensions shown are schematic, and that any suitable extent of penetration of the pipe link into the follower member, and of the support tubes into the follower member can be provided. Precise dimensions of the part are a matter of ready determination of the designer.

The followers have a first angular position shown in FIG. 3, and a second angular position shown in FIG. 2. In FIG. 3, the followers are at their first maximum axial spacing apart, and in FIG. 2 at their second minimum spacing apart. The pipe segment can be placed between them at their maximum spacing apart, and is trapped at their minimum spacing apart. One can rely on friction to hold the followers in the intended one of the positions. Clearly the major advantage is to hold them in the angular position respective to their second position, because this is the condition where the conduitry is closed and installed. Restraint against rotation from that position will prevent axial movement of the follower, and the pipe segment will be held. For this purpose, release lock means can be provided to restrain the follower members against rotation relative to the buttress members.

FIG. 5 shows releasable lock means 60 in the nature of a knurled thumb screw having a head 61 and a threaded shank 62. The shank is threaded into a threaded hole 63 in the follower member, and its tip 64 can be forced to bear against the support member. This will releasably lock the follower member against rotation.

In FIG. 6, the lock means comprises a lock plate 70 having a slot 71 through which the shank 72 of a thumbscrew 73 passes. The head 74 of the screw can be clamped against the lock plate to hold it in the illustrated position. The thumbscrew is threaded into the buttress member. This plate holds the follower member axially away from the buttress member, and also holds it against rotation as a consequence of its fit with it. Loosening the screw releases the lock means.

FIGS. 7 and 8 show lock means 80 in which a lock plate 81 has a fork 82 to embrace the buttress member. A slot 83 passes the shank 84 of a thumb screw 85. The shank threads into a hole 86 in the follower member, and clamps the lock plate to it. The lock plate thereby becomes a removable part of the follower member.

In the illustrated lock means of FIGS. 5 and 7, the tightened thumb screw prevents axial as well as rotational movement of the follower member. In all of the embodiments, the shoulder on the pipe limits the axial movement.

FIG. 9 shows an arrangement where buttress member 90 extends from only one side by a tube 91. Then follower member 92 need have only one cut-out 93 to act as follower to the camming surface 94. Buttress member 90 is obviously a part of a tee joint. The follower member can be duplicated at support-tube 95.

This invention thereby provides a rugged and simple pipe system wherein a pipe link can expeditiously be removed and replaced. Appropriate access can be provided as desired. The device is readily fitted together so a person can remove and replace this pipe link while working "blind."

This invention is not to be limited to the embodiments shown in the drawings and described in the description which are given by way of example and not of limitation, but only in accordance with the scope of the appended claims.

I claim:
1. A pipe system comprising:
   a first and a second buttress member, each said buttress member comprising a support tube, and at least one of them further including a camming surface, said support tubes being axially aligned and spaced from one another, said camming surface being formed on a substantially cylindrical outer wall intersecting normally the outer wall of its respective support tube;
   a tubular follower member coaxially surrounding said support tube of the buttress member which includes said camming surface, and being axially movable and rotatable thereon, an end of said follower member bearing against said camming surface and being non-circular and so proportioned and arranged as to cause said follower member to assume different axial positions along said axis at different angular positions around said axis, said follower member thereby having first and second angular positions corresponding to first and second axial positions;
   a pipe link comprising a rigid length of pipe having a length short enough to fit between said support tubes and said follower member when said follower member is in one of said positions, and to be trapped by it in the other of said positions; and
   means connecting the end of said pipe link not engaged by said follower member to a support tube.

2. A pipe system according to claim 1 in which said end of said follower member is a curve which fits the said cylindrical outer wall forming said camming surface.

3. A pipe system according to claim 2 in which said end of said follower member is circularly arcuate when viewed perpendicularly to said axis.

4. A pipe system according to claim 1 in which a seal is placed between said follower member and the pipe link, and between said follower member and said support tube.

5. A pipe system according to claim 1 in which the pipe link includes a shoulder limiting the axial movement of said follower member along the pipe link.

6. A pipe system according to claim 1 in which each said buttress member is ported to its respective support tube, whereby to provide for fluid flow to and from said pipe link.

7. A pipe system according to claim 6 in which at least one of said buttress member and said support tube form an elbow.

8. A pipe system according to claim 1 in which releasable lock means holds said follower member against rotation.

9. A pipe system according to claim 8 in which said releasable lock means comprises screw means holding said follower member against rotation relative to said support tubes.

10. A pipe system according to claim 8 in which said releasable lock means comprises a fork attachable to said follower member and embracing said buttress member.

11. A pipe system according to claim 8 in which said releasable lock means comprises a plate attachable to said buttress member and engageable with said follower member.

12. A pipe system according to claim 8 in which the pipe link includes a shoulder limiting the axial movement of said follower member along the pipe link.

13. A pipe system according to claim 9 in which the pipe link includes at each end a shoulder limiting the axial movement of said follower member along the pipe link.

14. A pipe system according to claim 10 in which the pipe link includes at each end a shoulder limiting the axial movement of said follower member along the pipe link.

15. A pipe system according to claim 11 in which the pipe link includes at each end a shoulder limiting the axial movement of said follower member along the pipe link.

16. A pipe system according to claim 1 in which both of said buttress members include a said camming surface, and in which a said follower member is provided at both of said buttress members, said pipe link being insertable between said follower members when they are at their maximum spacing apart, and trapped by them when they are in their minimum spacing apart.

17. A pipe system according to claim 16 in which said end of said follower member is a curve which fits the said cylindrical outer wall forming said camming surface.

18. A pipe system according to claim 17 in which said end of each of said follower members is circularly arcuate when viewed perpendicularly to said axis.

19. A pipe system according to claim 16 in which a seal is placed between each follower member and the pipe link, and between each follower member and each support tube.

20. A pipe system according to claim 16 in which the pipe link includes at each end a shoulder limiting the axial movement of each follower member along the pipe link.

21. A pipe system according to claim 16 in which each said buttress member is ported to its repsective support tube, whereby to provide for fluid flow to and from said pipe link.

22. A pipe system in which at least one of said buttress members and support tubes forms an elbow.

23. A pipe system according to claim 16 in which releasable lock means holds said follower members against rotation.

24. A pipe system according to claim 23 in which each said releasable lock means comprises screw means holding a respective said follower member against rotation relative to its respective said support tube.

25. A pipe system according to claim 23 in which each said releasable lock means comprises a fork attachable to a respective said follower member and embracing a respective said buttress member.

26. A pipe system according to claim 23 in which each said releasable lock means comprises a plate attachable to a respective said buttress member and engageable with a respective said follower member.

* * * * *